(12) United States Patent
Leiber

(10) Patent No.: US 6,487,945 B1
(45) Date of Patent: Dec. 3, 2002

(54) TOOL HEAD

(75) Inventor: Hans-Jürgen Leiber, Tramelan (CH)

(73) Assignee: Kummer Freres S.A., Tramelan (CH)

( * ) Notice: Subject to any disclaimer, the term of this patent is extended or adjusted under 35 U.S.C. 154(b) by 118 days.

(21) Appl. No.: 09/635,859

(22) Filed: Aug. 11, 2000

(30) Foreign Application Priority Data

Sep. 30, 1999  (EP) ............................................ 99810884

(51) Int. Cl.$^7$ .......................... B23B 41/00; B23B 29/00
(52) U.S. Cl. ................................ 82/1.4; 82/63; 82/133; 82/161
(58) Field of Search ............................ 82/1.2, 1.3, 11.4, 82/1.4, 19, 11.5, 63, 132, 133, 137, 138, 154, 161, 903; 408/153; 409/231, 232, 233

(56) References Cited

U.S. PATENT DOCUMENTS

| | | | | |
|---|---|---|---|---|
| 3,902,386 A | * | 9/1975 | Dressler et al. ................ | 82/1.4 |
| 4,508,475 A | | 4/1985 | Peuterbaugh | |
| 4,626,149 A | * | 12/1986 | Holy et al. .................. | 409/191 |
| 4,630,979 A | * | 12/1986 | Roux .......................... | 408/232 |
| 5,120,167 A | * | 6/1992 | Simpson ...................... | 408/158 |
| 5,307,714 A | | 5/1994 | Muendlein et al. | |
| 5,836,727 A | | 11/1998 | Scheer | |
| 6,050,159 A | * | 4/2000 | Kress et al. .................... | 82/1.2 |
| 6,128,985 A | * | 10/2000 | Muster et al. ................. | 82/1.4 |
| 6,134,996 A | * | 10/2000 | Scheer et al. .................. | 82/1.2 |

FOREIGN PATENT DOCUMENTS

| | | |
|---|---|---|
| EP | 34 08 352 A1 | 9/1985 |
| JP | A-06-335803 | 12/1994 |

* cited by examiner

Primary Examiner—Henry Tsai
(74) Attorney, Agent, or Firm—Oliff & Berridge PLC

(57) ABSTRACT

A tool head having a first slide fitted with a tool holder as well as a second slide for eliminating the unbalance effect created by the off-centering of the first slide. An actuating device that can be actuated longitudinally that is able to control the radial displacement of the two slides. Each of these slides is provided with a pressing device for pressing the slide against an oblique support surface of the actuating device. The force exerted by each of the pressing devices is determined, so as to be greater than the centrifugal force exerted on each slide and in a direction opposed to that of the centrifugal force. This force is determined so that the resultant force of all forces exerted on each slide is constant.

10 Claims, 3 Drawing Sheets

TOOL HEAD

The content of Application No. 99810884.9, filed Sep. 30, 1999, in Europe, is hereby incorporated by reference.

BACKGROUND OF THE INVENTION

The present invention concerns a tool head that can be mounted on a machine tool headstock and fitted with a radially movable tool holder slide. Such a tool head allows the machining of cylindrical portions that are external or internal, coaxial, of different diameters, as well as of circular or truncated plane faces, with a single machining tool.

BRIEF SUMMARY OF THE INVENTION

Different tool heads able to perform a machining of this type are known from the prior art.

The company Komet in Besigheim, Germany, supplies a tool head of this type comprising a first slide that can be moved perpendicularly to the axis of rotation of the tool head and that carries the machining tool, as well as a second slide to compensate unbalance and that can also be moved perpendicularly to the axis of rotation of the tool head. The mass of the second slide is equivalent to the sum of the masses of the first slide and of the tool it carries. Both slides are driven in opposite directions by a tension rod fitted with a double rack acting simultaneously on the two slides. This device has at least to major disadvantages, namely that the force necessary to act on the tension rod depends essentially on the centrifugal force exerted on the two slides, i.e. on the head's speed of rotation as well as on the radial position of the two slides. Consequently, use of such a tool head is limited at low machining speeds. The other inconvenience is caused by the play of the rack on the slides toothing, thus limiting the machining accuracy.

Other tool heads propose to have the machining tool swivel on an eccentric circle. Such a method means that the working angle of the tool on the work piece varies during machining, which is detrimental for the state of the worked piece's surface.

U.S. Pat. No. 4,508,475 of Peuterbaugh describes a tool head with two slides, the pressing means on the slides being constituted by springs. This document does not specify anywhere a relation between the pressing forces exerted by the springs and those exerted by the centrifugal force.

The hydraulic pressing means described in patent U.S. Pat. No. 5,307,714 of Muendlein et al. acts on the longitudinal actuator rod for moving the slides and not directly on the slides themselves. There is thus no compensation of the centrifugal force on the slides as sought.

A first object of the invention is therefore to propose a tool head able to perform a machining as proposed without the aforementioned inconveniences of known tool heads.

Another object of the invention is to propose a tool head that can perform a machining as proposed and whose force driving the means for radially displacing the tool is independent from the speed of rotation of the head as well as from the radial displacement of the tool.

Another object of the invention is to propose a tool head that can perform a machining as proposed and whose driving means for radially displacing the tool are free from play.

Another object of the invention is to propose a tool head that can perform a machining as proposed and that is of simple construction, reliable and requiring minimal maintenance.

According to the invention, these objects are achieved by a tool head as described in claim 1, variants or alternative embodiments being described in the dependent claims.

An embodiment of the invention is described hereafter, this description making reference to the attached drawings containing the figures and in which:

DETAILED DESCRIPTION OF THE PREFERRED EMBODIMENTS

Figure 1:
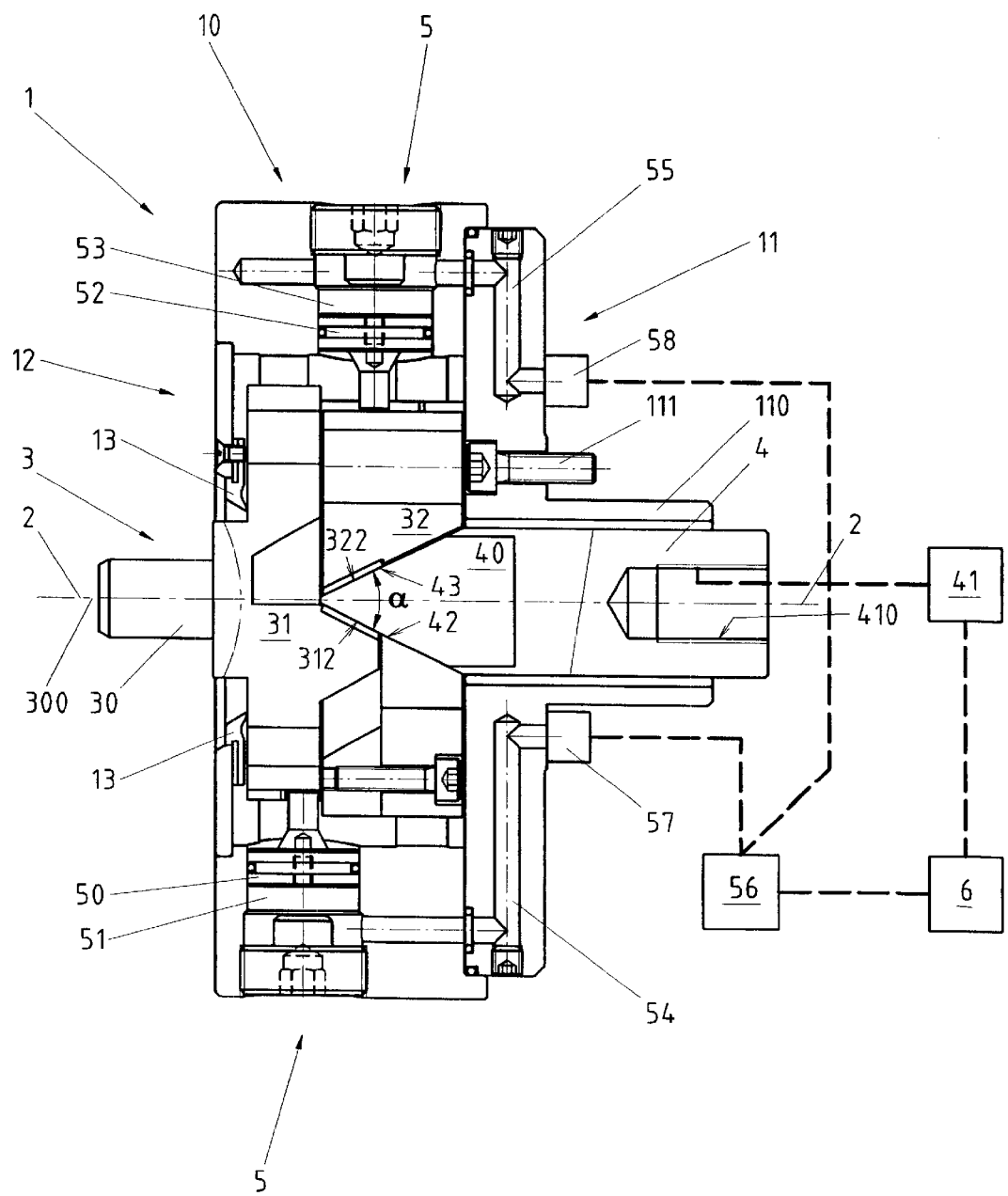
FIG. 1 represents a preferred embodiment of a tool head according to the invention, in a section according to a plane parallel to the direction of the tool holder's displacement as well as to the axis of rotation of the tool head.

The tool head 1 of FIG. 1 is essentially constituted of a body 10, of a generally cylindrical shape, composed, as will be seen, of several elements. On the rear side 11 of the body 10 there is a tubular drive shaft 110 that can be inserted in the driving element of the machine tool, not represented here. A plurality of screw rods 111, regularly spaced on a circle of the rear side 11, ensure that the body 10, respectively the tool head 1, is attached on the driving element and is driven in rotation around an axis of rotation represented under 2. The front side 12 of the body 10 comprises the tool holder 3, constituted here of a segment of a cylindrical shaft 30 mounted on a first slide 31.

A machining tool, not represented in the figures, can be mounted on the cylindrical segment 30 of the tool holder 3.

Figure 3:
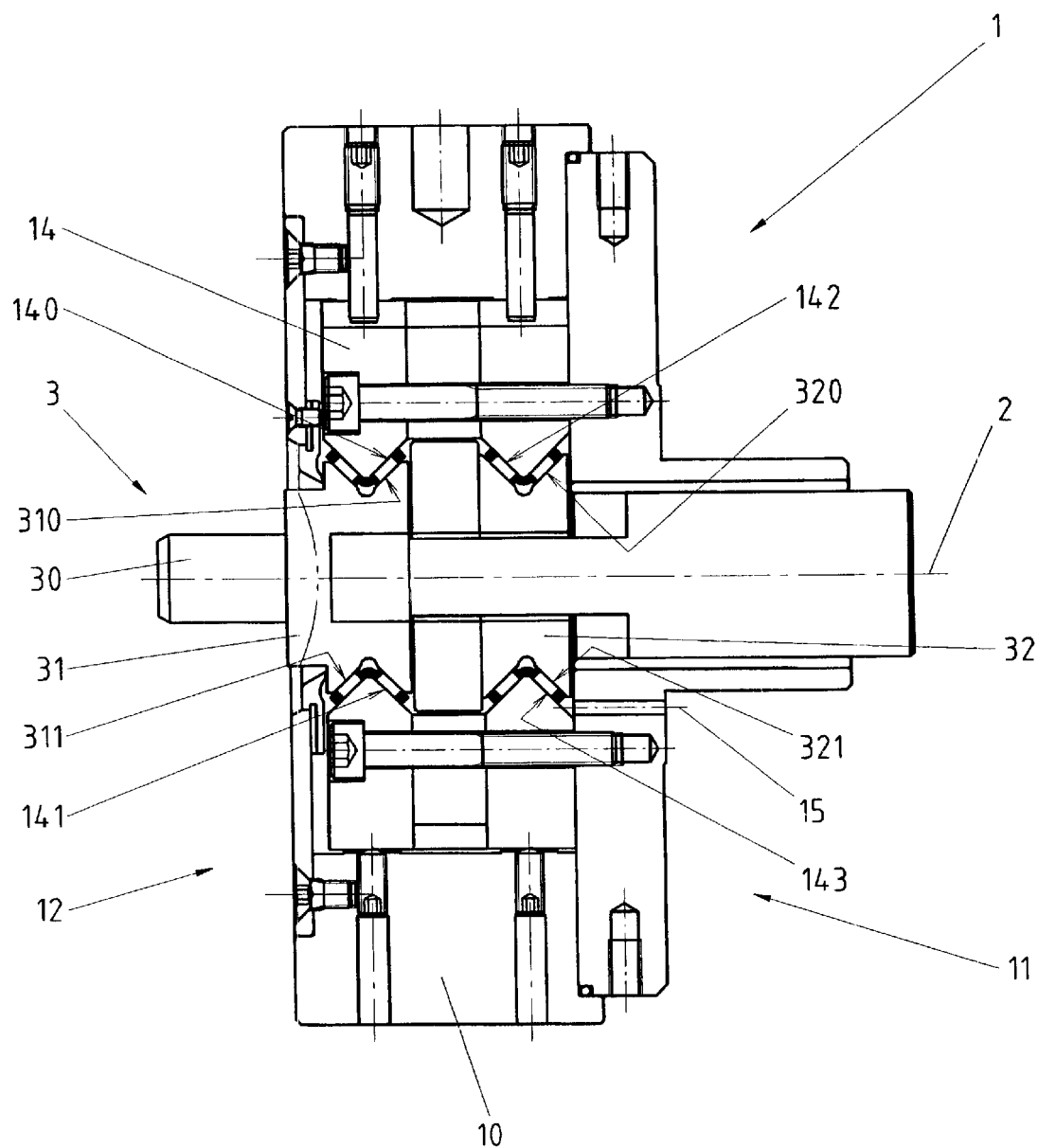
FIG. 3 is a section according to a plane perpendicular to the sectional plane of the two preceding views.

With reference to FIG. 3, it can be seen that the two lateral sides 310 and 311 of the first slide 31 are concave, shaped in a V, so as to correspond to the convex sliding sides 140 and 141 of a guiding element 14 being part of the body 10. Needle bearings placed between the sides 310 and 140, respectively 311 and 141, facilitate the sliding of the first slide 31 relative to the guiding element 14.

A second slide 32, intended to eliminate the unbalance created by the tool holder 3, is placed here facing the side of the first slide 31 opposite the side fitted with the cylindrical segment 30. As for the preceding slide, and as represented in FIG. 3, the second slide 32 has two lateral sides 320 and 321 guided, as above, via needle bearings by sliding faces 142 and 143 of the guiding element 14.

Figure 2:
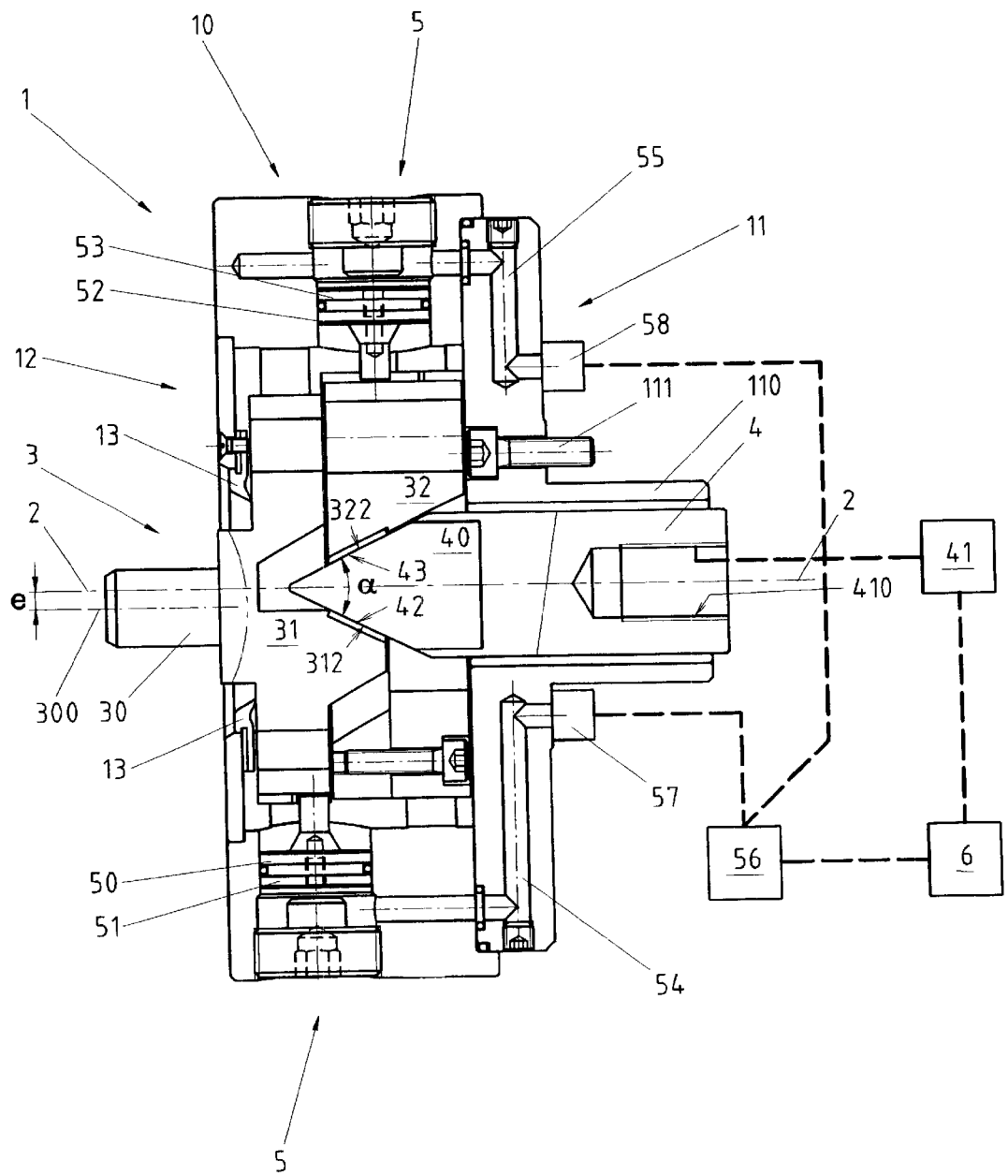
FIG. 2 is a view similar to the preceding one for another radial position of the tool holder.

Reverting to FIG. 1, it can be seen that the rear portion of the first slide 31 as well as the rear portion of the second slide 32 comprise each an oblique support surface 312, respectively 322, resting on a V-shaped tip 40 of a radial actuator 4. The actuator 4 is here disposed coaxially to the axis of rotation 2 of the tool head, inside the hollowed part of the tubular drive shaft 110; it is able to take any position between a retracted position, as seen in FIG. 1, and an advanced position, as seen in FIG. 2. Operating means, as for example the numerical axis schematized under 41, are linked to this effect to the actuator 4, for example by means of the internal screw thread 410.

Thus, in retracted position as seen in FIG. 1, the two oblique support surfaces 312 and 322 of the two slides 31 and 32 are pressed, by means that will be described further below, against the corresponding oblique planes 42 and 43 of the V-shaped tip 40 of the actuator 4. When the actuator 4 is moved to any axial position between the position represented in FIG. 1 and that represented in FIG. 2, it can be seen that the faces 42 and 43 push in opposite directions the two slides 31 and 32 through their support surfaces 312 and 322. Thus, according to the axial position of the actuator 4, the tool carried by the cylindrical segment 30 of the tool holder 3 is shifted radially relative to the axis of rotation 2 of the spindle, the axis of the drive shaft 30 being represented under 300, the shift being of a value "e" as in FIG. 2.

When the radial shift of the tool holder 3 is made to vary, the tool mounted on the shaft 30 is shifted of the same value, so that it works the piece according to a diameter having varied of the double of this value. Thus, with a single tool mounted on the shaft 30, it is possible to work a piece with a plurality of different diameters, all coaxial, as well as circular or annular and truncated portions.

Preferably, the angles formed by the oblique planes 42 and 43, respectively 312 and 322, are equal, so that the radial displacement of the second slide 32 is equal to, but in the opposite direction from, the radial displacement of the first slide 31. By sizing the second slide 32 so that its mass corresponds to the mass of the first slide 31 and of the tool it carries, and so that the centers of gravity of the two slides are exactly opposed, the unbalance of the body 10 rotating around axis 2 can be eliminated.

Preferably, the angle α separating the two oblique planes 42 and 43 is determined so that the value of the tangent of half of this angle equals 0.5, i.e. that the angle α equals 53.13°. Thus one can demonstrate that an axial displacement of a determined value of the actuator 4 results in a radial displacement of the slide 31, respectively of the slide 32, of a value corresponding to half of the value of the axial displacement of the actuator 4. Thus, for a determined axial displacement of the actuator 4, one has a variation by the same value of the working diameter.

When the working head 1 rotates around the axis 2, the centrifugal force tends to move the two slides 31 and 32 radially apart. In order to prevent this effect, pressing means 5 are provided, which are constituted of a first piston 50, disposed in a first piston chamber 51 provided in a portion of the body 10, and a second piston 52, disposed in a second piston chamber 53 provided on an opposite portion of the body 10. The first piston 50 is connected here to the extremity of the slide 31 that is furthest away from the axis 2, whereas the second piston 52 is connected to the corresponding extremity of the slide 32. Connection pieces 54 and 55 join each of the chambers 51 and 53 with an input opening disposed for example on the rear side 11 of the body 10. Pressurizing means, hydraulic or pneumatic, schematized under 56, inject through rotative distribution chambers of a known art 57 and 58 a hydraulic or pneumatic pressure in each of the connection pieces 54 and 55, respectively in each of the chambers 51 and 53. These two pressures thus tend to oppose the centrifugal force exerted on the slide 31 as well as on the slide 32.

A control unit 6 commands the value of the hydraulic or pneumatic pressure introduced in the chambers 51 and 53. Preferably, the force exerted by this pressure on the pistons 50 and 52 is greater than the centrifugal force applied to the two slides 31 and 32, so as to continuously press the surfaces 312 and 322 of the slides 31 and 32 onto the sides 42 and 43 of the actuator 4. The control means 6 are able to command this pressure so that the resulting force corresponding to the difference between the force exerted by this pressure on the piston 50 or 52 and the centrifugal force exerted on the slide 31 or 32 remains constant. Therefore, whatever the axial position of the actuator 4, the tip 40 is subjected to two opposed forces, each corresponding to the aforementioned constant resulting force.

It is known that the centrifugal force is a function: A- of the mass of moving elements, i.e. of that of the tool holder 3 comprising the slide 31 and the shaft portion 30, to which is added that of the tool, corresponding as seen above to the mass of the slide 32, B- of the squared speed of rotation as well as C- of the off-centering of the elements in motion. The masses being known, the control unit 6 will thus command the pressurizing means 56, so that the hydraulic or pneumatic pressure introduced in the chambers 51 and 53 takes into account the off-centering as well as the speed of rotation of the tool head, these two values being supplied by the numerical control or any other control of the machine-tool. The off-centering is given for example by the numerical axis 41.

The tip 40 of the actuator 4 receives from each slide 31 and 32 a force corresponding to the constant resulting force described above and exerted on each of the oblique planes 42 and 43. It can be demonstrated that the decomposing of each of these forces produces notably a component exerted axially on the actuator 4. With the aforementioned angle α of 53.13° separating the two oblique planes 42 and 43, the sum of the axial components due to the two resulting forces exerted radially corresponds to a value of one of the resulting forces. Since, as described above, the control means for pressurizing the chambers 51 and 53 are able to make the resulting forces equal and constant, one has thus in the end an axial force exerted on the actuator 4 which is constant, independently from the speed of rotation of the tool head and from the off-centering of the working tool.

Preferably, the pressurizing means are sized so that the axial force exerted on the actuator 4 is sufficient to ensure an adequate contact between the oblique sides 42 and 43 and the support surfaces 312 and 322, but not too important so as not to require a numerical axis 41 that is too strong and to prevent a premature wear and tear of the surfaces 42, 43 as well as 312 and 322 in sliding contact.

Preferably, the surfaces 42 and 43 as well as the surfaces 312 and 322 are treated or provided with means against wear and tear and/or are self-lubricating.

FIG. 3 shows furthermore an opening and a pressured air introduction canal 15 exiting on a hollow portion of the inside of the tool head 1. Through a rotating joint, not represented, air is introduced with a slight super-pressure, for example 0.5 bar, inside said hollow portion of the tool head's inside. This air escapes through a joint 13 disposed on the front side 12 of the body 10, encircling the mobile portion of the device visible from that side, i.e. a portion of the first slide 31 as well as the tool-carrying shaft 30. In this manner, one can avoid sprayings of oil or chips inside the tool head, which could damage the device or prevent it from operating properly.

The preceding description and figures describe a preferred embodiment of an eccentric tool head. Different embodiments can be considered by the one skilled in the art, notably the angle α between the oblique planes 42 and 43 described above as being 53.13° can in fact have any value according to need. In particular, another preferred value for the angle α could be 90°. An axial displacement of the actuator 4 would cause a radial displacement of the tool of the same value, corresponding to a variation of this value of the working range. in this case, the axial force could be equal to the double of a radial force exerted by a slide.

What is claimed is:

1. A tool head, comprising:
   a tool holder having a first slide able to be displaced both ways along a first direction perpendicular to an axis of rotation of the tool head, a second slide able to be displaced both ways along a second direction parallel to said first direction, a displacement control means for controlling the displacement of said first slide and said second slide and able to move said first slide and said second slide in an opposed direction from each other, said displacement control means being operated both ways of a direction parallel to the axis of rotation of the tool head, pressing means able to exert on said first slide and said second slide a force greater than a centrifugal force exerted on said first slide and said second slide and in a direction opposed to that of the centrifugal force, such that the resulting force exerted on said first slide and said second slide remains at a constant value, and a control unit, said pressing means being operated by the control unit.

2. The tool head according to claim 1, wherein the displacement control means for controlling the displacement of said first slide and said second slide comprises a first plane surface disposed in a first support plane perpendicular to a plane containing the axis of rotation of the tool head as well as the direction of displacement of the first slide, said first support plane being inclined relatively to said axis of rotation as well as to said direction of displacement, said first plane surface being continually in contact with a support surface of the first slide, said support surface being parallel to said first support plane, as well as a second plane surface disposed in a second support plane perpendicular to a plane containing the axis of rotation of the tool head as well as the direction of displacement of the second slide, said second support plane being inclined relatively to said axis of rotation as well as to said direction of displacement, said second plane surface being continually in contact with a support surface of the second slide, said support surface being parallel to said second support plane, both plane surfaces of the means for controlling the displacement forming an angle α.

3. The tool head according to claim 2, wherein the angle α formed by the two plane surfaces of the displacement control means is symmetrical relatively to the axis of rotation of the tool head.

4. The tool head according to claim 3, wherein a tangent of half of the angle α formed by the two plane surfaces of the displacement control means equals 0.5.

5. The tool head according to claim 1, wherein the pressing means acting on the first slide ensures that a support surface of said first slide is continuously in contact with a first plane surface of the displacement control means and in that the pressing means acting on the second slide ensures that a support surface of said second slide is continuously in contact with a second plane surface of the displacement control means, independently from a speed of rotation of a spindle head as well as from the values and displacement direction of said first slide and said second slide.

6. The tool head according to claim 1, wherein the resulting force, corresponding to the difference between the force exerted by the pressing means on the corresponding slide and the centrifugal force exerted in said slide is constant, independently from a speed of rotation of a spindle head as well as from the values and displacement directions of said first slide and said second slide.

7. The tool head according to claim 1, wherein said pressing means comprises a first piston radially mobile in a first pressure chamber and connected to said first slide, and a second piston radially mobile in a second pressure chamber and connected to said second slide, and a pressurizing means for introducing a determined pressurized fluid in each of said pressure chambers.

8. The tool head according to claim 7, wherein said determined pressure is equal in both pressure chambers.

9. The tool head according to claim 7, wherein the value of said pressure is determined by the control unit and is calculated by taking notably into account the parameters of a speed of rotation of the tool head and an off-centering of the tool holder.

10. The tool head according to claim 1, further comprises an inlet connected to a super-pressurizing supply, for pneumatically super-pressurizing an inside portion of said tool head as well as a joint applied between the first slide that is movable radially and the portion of a front side of the tool head that is not movable radially.

* * * * *